(12) United States Patent
Knapp (10) Patent No.: US 8,678,399 B2
(45) Date of Patent: Mar. 25, 2014

(54) GASKET

(71) Applicant: Mark Knapp, Ravenna, OH (US)

(72) Inventor: Mark Knapp, Ravenna, OH (US)

(73) Assignee: Springseal, Inc., Streetsboro, OH (US)

( * ) Notice: Subject to any disclaimer, the term of this patent is extended or adjusted under 35 U.S.C. 154(b) by 0 days.

(21) Appl. No.: 13/909,357

(22) Filed: Jun. 4, 2013

(65) Prior Publication Data

US 2013/0270776 A1    Oct. 17, 2013

Related U.S. Application Data

(62) Division of application No. 11/810,862, filed on Jun. 7, 2007, now Pat. No. 8,474,830.

(51) Int. Cl.
*F16J 15/02* (2006.01)

(52) U.S. Cl.
USPC .......................................... 277/644

(58) Field of Classification Search
USPC ........... 277/604, 605, 616, 625; 285/110, 344
See application file for complete search history.

(56) References Cited

U.S. PATENT DOCUMENTS

| 2,230,725 A | 2/1941 | Nathan |
| 2,259,940 A | 10/1941 | Nathan |
| 2,578,933 A | 12/1951 | Hunter et al. |
| 2,953,398 A | 9/1960 | Haugen et al. |
| 2,980,449 A | 4/1961 | Dunton |
| 3,031,200 A | 4/1962 | Hamer |
| 3,118,682 A | 1/1964 | Fredd |
| 3,265,410 A | 8/1966 | Lorang |
| 3,315,971 A | 4/1967 | Sakurada |
| 3,380,763 A | 4/1968 | Schmunk |
| 3,386,745 A | 6/1968 | Hein |
| 3,445,120 A | 5/1969 | Barr |
| 3,469,854 A * | 9/1969 | Linwood ...................... 277/530 |
| 3,584,889 A | 6/1971 | Sheets |
| 3,680,875 A | 8/1972 | Hawthorne |

(Continued)

FOREIGN PATENT DOCUMENTS

| DE | 3826622 | 2/1990 |
| DE | 3909381 | 12/1990 |

(Continued)

OTHER PUBLICATIONS

International Preliminary Examination Report PCT/US05/44887, Aug. 29, 2006, Mark Knapp.

(Continued)

*Primary Examiner* — Vishal Patel
(74) *Attorney, Agent, or Firm* — Tarolli, Sunheim, Covell & Tummino LLP (57) ABSTRACT

A gasket is provided that forms a sealing connection between a pair of tubular members. The gasket comprises a first section shaped to fit within a recess of one of a pair of tubular members. The first section includes an anchor portion comprising first and second sides. The gasket further comprises a second section extending from the first section and is configured to make a sealing contact with the other of the tubular members. The gasket also includes at least one self-locating arm in a sealing contact within the recess and extending from one of the first or second sides of the anchor portion of the first section. The self-locating arm biases the first section such that the other of the first or second sides is in contact with the recess to form a sealing connection.

10 Claims, 8 Drawing Sheets

(56) References Cited

U.S. PATENT DOCUMENTS

| | | |
|---|---|---|
| 3,695,639 A | 10/1972 | Shire et al. |
| 3,796,447 A | 3/1974 | de Putter |
| 3,813,107 A | 5/1974 | Ditcher |
| 3,856,315 A | 12/1974 | Stansbury |
| 3,857,589 A | 12/1974 | Oostenbrink |
| 3,858,912 A | 1/1975 | Bower |
| 3,865,386 A | 2/1975 | Wilke |
| 3,955,834 A | 5/1976 | Ahlrot |
| 4,018,461 A | 4/1977 | Bram |
| 4,097,074 A | 6/1978 | Nagao et al. |
| 4,188,040 A | 2/1980 | Wolf et al. |
| 4,223,895 A | 9/1980 | Roberts, Jr. et al. |
| 4,298,206 A | 11/1981 | Kojima |
| 4,333,662 A | 6/1982 | Jones |
| 4,365,818 A | 12/1982 | Tolliver |
| 4,387,900 A | 6/1983 | Ditcher et al. |
| 4,394,024 A | 7/1983 | Delhaes |
| 4,395,159 A | 7/1983 | Karuks et al. |
| 4,487,421 A | 12/1984 | Housas et al. |
| 4,552,914 A | 11/1985 | Sterling |
| 4,566,704 A | 1/1986 | van Dongeren |
| 4,575,128 A | 3/1986 | Sundquist |
| 4,585,026 A | 4/1986 | Norton |
| 4,602,792 A | 7/1986 | Andrick |
| 4,602,793 A | 7/1986 | Andrick |
| 4,630,848 A | 12/1986 | Twist et al. |
| 4,641,858 A | 2/1987 | Roux |
| 4,642,269 A | 2/1987 | Kohyama et al. |
| 4,702,502 A | 10/1987 | Shade et al. |
| 4,711,474 A | 12/1987 | Patrick |
| 4,743,422 A | 5/1988 | Kalriis-Nielsen et al. |
| 4,756,784 A | 7/1988 | Jones et al. |
| 4,772,154 A | 9/1988 | Caroulle |
| 4,795,166 A | 1/1989 | Irmler |
| 4,818,209 A | 4/1989 | Petersson et al. |
| 4,826,028 A | 5/1989 | Vassallo et al. |
| 4,834,398 A | 5/1989 | Guzowski et al. |
| 4,969,653 A | 11/1990 | Breen |
| 5,013,052 A | 5/1991 | Butler et al. |
| 5,045,635 A | 9/1991 | Kaplo et al. |
| 5,058,907 A | 10/1991 | Percebois et al. |
| 5,064,207 A | 11/1991 | Bengtsson |
| 5,067,751 A | 11/1991 | Walworth et al. |
| 5,106,129 A | 4/1992 | Camacho et al. |
| 5,114,162 A | 5/1992 | Ditcher |
| 5,131,667 A | 7/1992 | Mong et al. |
| 5,143,381 A | 9/1992 | Temple |
| 5,169,161 A | 12/1992 | Jones |
| 5,180,196 A | 1/1993 | Skinner |
| 5,288,087 A | 2/1994 | Bertoldo |
| 5,324,083 A | 6/1994 | Vogelsang |
| 5,326,138 A | 7/1994 | Claes et al. |
| 5,346,662 A | 9/1994 | Black et al. |
| 5,360,851 A | 11/1994 | Feder et al. |
| 5,407,236 A | 4/1995 | Schwarz et al. |
| 5,415,436 A | 5/1995 | Claes et al. |
| 5,542,717 A | 8/1996 | Rea et al. |
| 5,573,279 A | 11/1996 | Rea et al. |
| 5,577,741 A | 11/1996 | Sink |
| 5,603,532 A | 2/1997 | Guest |
| 5,626,349 A | 5/1997 | Sutherland et al. |
| 5,687,976 A | 11/1997 | Andrick et al. |
| 5,735,528 A | 4/1998 | Olsson |
| 5,806,593 A | 9/1998 | Surles |
| 5,813,705 A | 9/1998 | Dole |
| 5,973,061 A | 10/1999 | Feder et al. |
| 5,988,695 A | 11/1999 | Corbett, Jr. |
| 5,992,469 A | 11/1999 | Hegler |
| 5,996,635 A | 12/1999 | Hegler |
| 6,082,741 A | 7/2000 | Gregoire et al. |
| 6,126,173 A | 10/2000 | Westhoff et al. |
| 6,126,209 A | 10/2000 | Goddard |
| 6,170,883 B1 | 1/2001 | Matsson et al. |
| 6,193,285 B1 | 2/2001 | Proctor |
| 6,237,966 B1 | 5/2001 | Kearns |
| 6,328,309 B1 | 12/2001 | Corbett, Jr. |
| 6,336,640 B1 * | 1/2002 | Knapp .................. 277/606 |
| 6,343,623 B2 | 2/2002 | Hegler |
| 6,359,073 B1 | 3/2002 | Babb et al. |
| 6,367,802 B1 | 4/2002 | Knapp |
| 6,476,141 B1 | 11/2002 | Chang et al. |
| 6,550,775 B2 | 4/2003 | Knapp |
| 6,620,369 B1 | 9/2003 | Mead |
| 6,726,219 B2 | 4/2004 | Bivens |
| 6,739,632 B1 | 5/2004 | Thomas et al. |
| 6,948,718 B2 | 9/2005 | Shaffer et al. |
| 6,962,373 B2 * | 11/2005 | Houghton ............... 285/110 |
| 7,331,582 B2 | 2/2008 | Shaffer et al. |
| 7,469,905 B2 | 12/2008 | Knapp |
| 7,731,884 B2 | 6/2010 | Knapp et al. |
| 2003/0001343 A1 | 1/2003 | Andrick |
| 2004/0041347 A1 * | 3/2004 | Beach et al. ............ 277/314 |
| 2004/0072949 A1 | 4/2004 | Ding et al. |
| 2004/0108714 A1 * | 6/2004 | Houghton ............... 285/110 |
| 2005/0218653 A1 | 10/2005 | Shaffer et al. |
| 2006/0192349 A1 | 8/2006 | Knapp |
| 2006/0279084 A1 | 12/2006 | Collins |
| 2007/0290455 A1 | 12/2007 | Knapp et al. |

FOREIGN PATENT DOCUMENTS

| | | |
|---|---|---|
| DE | 19628639 | 1/1998 |
| EP | 0311296 | 4/1989 |
| GB | 2331137 | 5/1999 |
| WO | WO 2006/063338 | 6/2006 |

OTHER PUBLICATIONS

International Search Report PCT/US-5/44887, Apr. 19, 2006, Mark Knapp.

International Search Report with Written Opinion PCT/US0544887, Apr. 19, 2006, Mark Knapp.

European International Search Report EP05863734, Sep. 24, 2009, Mark Knapp.

* cited by examiner

GASKET

CROSS-REFERENCES TO RELATED APPLICATIONS

The present application is a divisional application of co-pending application Ser. No. 11/810,862 filed on Jun. 7, 2007, entitled GASKET and published on Dec. 11, 2008 under Publication No. US 2008/0303224. The present application claims priority the above-identified patent application, which is incorporated in its entirety herein by reference for all purposes.

TECHNICAL FIELD

The present invention relates to gasket for providing a seal between two members, and more specifically an elastomeric gasket having both geometrical and composition configurations for providing an enhanced seal between the two members.

BACKGROUND OF THE INVENTION

It is desirable to form a seal between two pipe sections, such as two corrugated pipe sections where the end of one of the pipe sections has annular grooves and one of the pipe sections has an enlarged bell portion at one end. It is not uncommon to place elastomeric gaskets around the end of the pipe section having annular grooves. The pipe section having annular grooves is inserted into an enlarged bell portion of the second pipe section. The elastomeric gasket contacts each of the pipe sections to form a seal between the pipe sections.

Typically, a large frictional force is encountered when the inner pipe and the elastomeric gasket is inserted into the outer pipe. As one end of the inner pipe is pushed into the enlarged end or bell of the outer pipe section or pipe connector, the gasket is sometimes pulled from the groove by the large frictional force. When the pipe is not properly sealed, ground water may leak into the pipe or fluid may leak out of the pipe and contaminate the ground.

It is not uncommon for the joining sections of the corrugated pipe to be exposed to numerous forces causing stress to the gasket over the life of the connection. Such stress whether from the connection between the two pipe sections or the stresses resulting from the pipe connection being pulled or normal operation such as the passage of fluids may allow the gasket to move from its desired location or allow debris to infiltrate the gasket seat, reducing the effectiveness of the sealing connection.

In order to reduce the dislocation of the gasket or the infiltration of debris in the corrugation, advances in both gasket composition and/or geometrical configuration have been proposed.

SUMMARY OF THE INVENTION

The present invention relates to a gasket that forms a sealing connection between a pair of tubular members. The gasket comprises a first section shaped to fit within a recess of one of a pair of tubular members. The first section includes an anchor portion comprising first and second sides. The gasket further comprises a second section extending from the first section and is configured to make a sealing contact with the other of the tubular members. The gasket also includes at least one self-locating arm in a sealing contact within the recess and extending from one of the first or second sides of the anchor portion of the first section. The self-locating arm biases the first section such that the other of the first or second sides is in contact with the recess to form a sealing connection.

The present invention also relates to a gasket for forming a sealing connection between a pair of adjoining tubular members comprising a first section composed of a first material shaped to fit within a recess of one of a pair of adjoining tubular members. The first section has an anchor portion comprising first and second sides. The gasket also has a second section composed of a second material having a lower durometer than the first material and is coupled with the first section and is configured to make a sealing contact with the other of the pair of tubular members. The second section further comprises a head member extending from the second section for engaging one of the pair of tubular members and a shoulder portion extending from the second section and is positioned outside of the recess in contact with the other of the pair of tubular members for providing support to the gasket. Both the head member and shoulder portion are eccentrically positioned with the first section. The gasket further comprises at least one self-locating member in a sealing contact within the recess and extending from one of the first or second sides of the anchor portion of the first section. The at least one self-locating member biases the first section such that the other of the first or second sides is in contact with the recess to form a sealing connection.

The present invention further relates to a gasket for forming a sealing connection between a pair of adjoining tubular members comprising a first section composed of a first material shaped to fit within a recess of one of a pair of adjoining tubular members. The first section has a v-shaped anchor portion comprising first and second sides. A second section is composed of a second material having a lower durometer than the first material and is coupled to one of the first or second sides of the first section and configured to make a sealing contact with the other of the pair of tubular members. The second section further comprises a head member that engages one of the pair of tubular members and a shoulder portion that is positioned outside of the recess in contact with the other of the pair of tubular members for providing support to the gasket. The gasket further includes at least one self-locating member in a sealing contact within the recess and extending from one of the first or second sides of the v-shaped anchor portion of the first section. The at least one self-locating member biases the first section such that the other of the first or second sides is in contact with the recess to form a sealing connection.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS

Figures 1, 2:
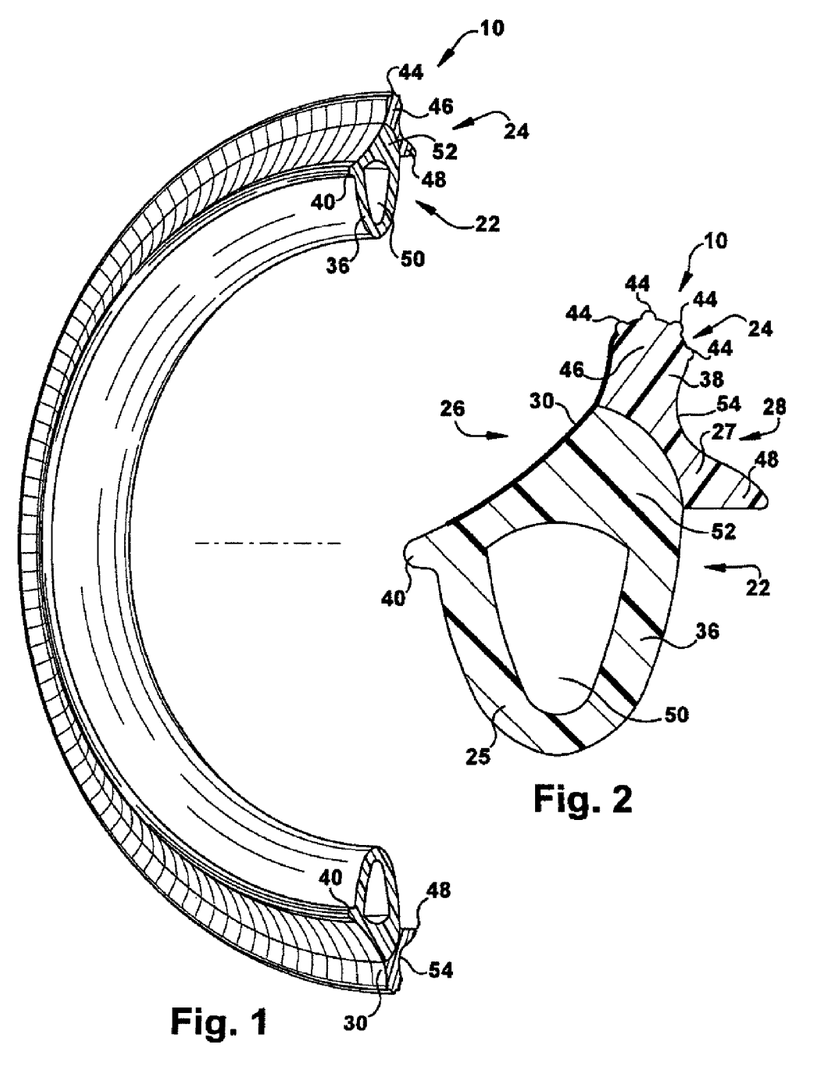
FIG. 1 is a perspective view of a portion of a gasket illustration one exemplary embodiment constructed in accordance with the present invention.
FIG. 2 is a cross section of the annular gasket illustrated in FIG. 1.
Figure 3:
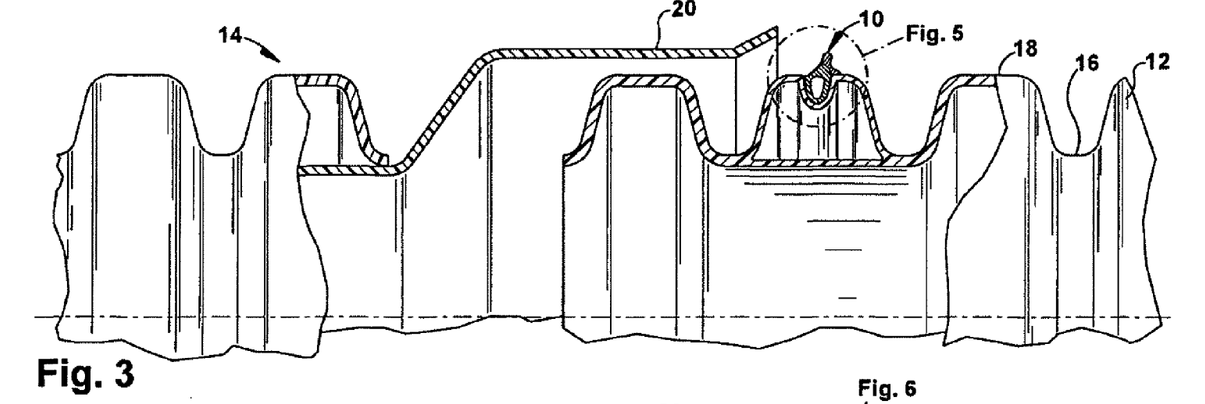
FIG. 3 is a sectional view illustrating the gasket embodiment of FIG. 1 seated in a channel portion of a corrugated pipe.

FIG. 1 illustrates a perspective view of an exemplary embodiment of a gasket 10 constructed in accordance with the present invention. The gasket 10 provides a fluid tight seal between a first tubular member 12 and second tubular member 14 illustrated in FIGS. 3 and 4. In the illustrated embodiment, the first tubular member 12 has a plurality of annular grooves 16 and annular ridges 18 and the second tubular member includes a smooth annular section 20, such as a bell.

While FIG. 1 illustrates an annular shaped gasket 10, the size and shape could vary as required to provide a fluid tight seal between two components without departing from the spirit and scope of the claimed invention. In exemplary embodiment illustrated in FIGS. 1 and 2, the gasket 10 is formed from three different materials and includes a lower portion 22 and an upper portion 24. The lower portion 22 is made from a first material 25 having a relatively hard durometer. An example of a suitable material would be an elastomeric material having a durometer range for the lower portion 22 between 60 and 80 durometer on a Shore A scale. Although elastomeric materials have been discussed, various polymers or rubbers having a durometer between 60 and 80 on a Shore A scale could also be used as a suitable first material without departing from the spirit and scope of the claimed invention.

The upper portion 24 is made from a second material 27 having a relatively pliable durometer relative to the first material. An example of a suitable material would be an elastomeric material having a durometer range for the upper portion 24 between 40 and 60 durometer on a Shore A scale. An example of such material includes ASTM F477 Low Head material (ASTM F477 LH) which has a durometer of 50 plus or minus five. One company that makes ASTM F477 LH material is Advanced Elastomer Systems L.P. located in Akron, Ohio under their brand name SANTOPRENE®. Advanced Elastomer Sytems' part number for SANTOPRENE® is 101-55. Multibase, a Dow Corning Company also produces ASTM F477 LH material under the part number 5904LC. Although elastomeric materials have been discussed, various polymers or rubbers having a durometer between 40 and 60 on a Shore A scale could also be used as a suitable second material without departing from the spirit and scope of the claimed invention.

The gasket 10 includes a leading side 26 and a trailing side 28. Extending along a portion of the leading side 26 is a third material that forms a portion of the gasket 10. The third material comprises a permanently lubricated material 30. The permanently lubricated material 30 could be made from any material having a low coefficient of friction "COF" and more specifically a level of point five (0.5) or less. An example of such suitable material for the lubricated material 30 includes polyethylene or polypropylene which has an approximate COF of point three (0.3). The lubricated material 30 is relatively thin, having a thickness range between 0.001" to 0.010" inches, preferably ranging between 0.003" to 0.005" inches thick, and is typically applied along a substantial portion of the leading side 26. The lubricated material 30 can be extruded onto the gasket simultaneously with the first and second materials, eliminating a need for a secondary operation for applying lubrication to a gasket. Further discussions relating to the application of a permanently lubricated material to a gasket is found in Applicant's currently co-pending U.S. patent application Ser. No. 11/411,551 having a filing date of Apr. 26, 2006 entitled PERMANENTLY LUBRICATED FILM GASKET AND METHOD OF MANUFACTURE, published Aug. 31, 2006 under U.S. Publication Number: US-2006-0192349, which is incorporated herein by reference for all purposes.

In an alternative exemplary embodiment, the lubricated material 30 could be bonded in a secondary operation, applied in a mold, or thermoformed to the first and second materials as further described in Applicant's currently co-pending U.S. patent application Ser. No. 11/666,763 having a filing date of May 2, 2007 entitled MOLDED GASKET AND METHOD OF MAKING, claiming priority to International Application Serial Number: PCT/US2005/044887 published Jun. 15, 2006 as WO 2006/063338, which is incorporated herein by reference for all purposes.

Figure 7:
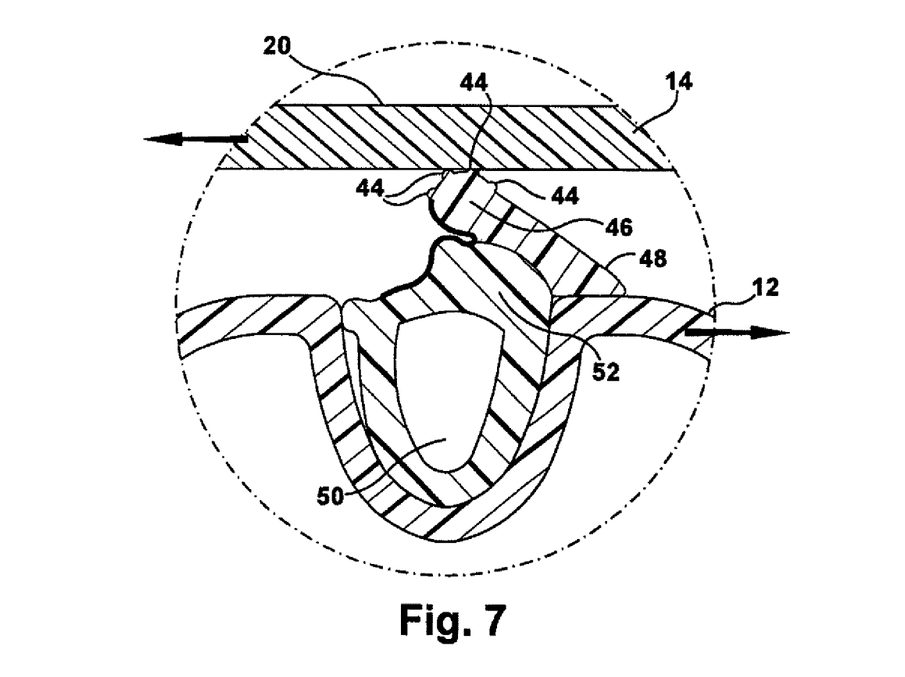
FIG. 7 is an enlarged fragmented view of the gasket embodiment of FIG. 1 resisting movement from the sealing position of FIG. 6.

The lubricating material 30 reduces the COF between the first and second tubular members 12, 14, respectively during the interconnecting of the members. Another advantage of the lubricating material 30 is that after the pipe is assembled, the non-lubricated trailing side 28 acts as a lock, gripping the pipe, thereby resisting separation between the first and second tubular members, as illustrated in FIG. 7. In yet an alternative exemplary embodiment, the gasket 10 is formed from only the first and second materials, lacking the lubricated material 30. Such application may be desired when the connection between the first tubular member 12 and second tubular member 14 is achieved mechanically.

Figure 4:
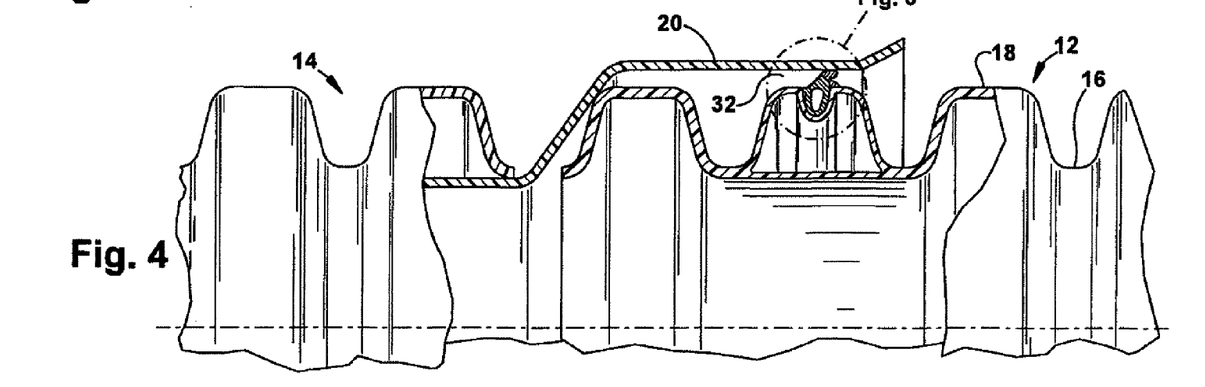
FIG. 4 is a sectional view illustrating the gasket embodiment of FIG. 1 seated in the channel of a corrugated pipe and engaged by an enlarged end of a second pipe.
Figure 5:
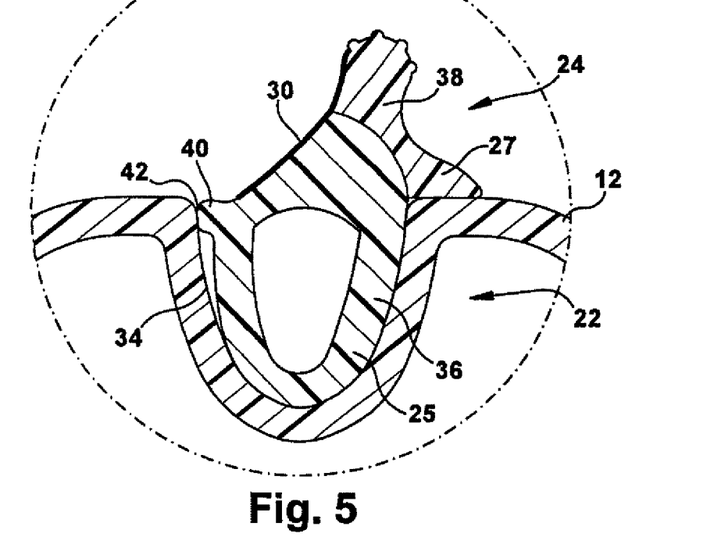
FIG. 5 is an enlarged fragmented view of FIG. 3.
Figure 6:
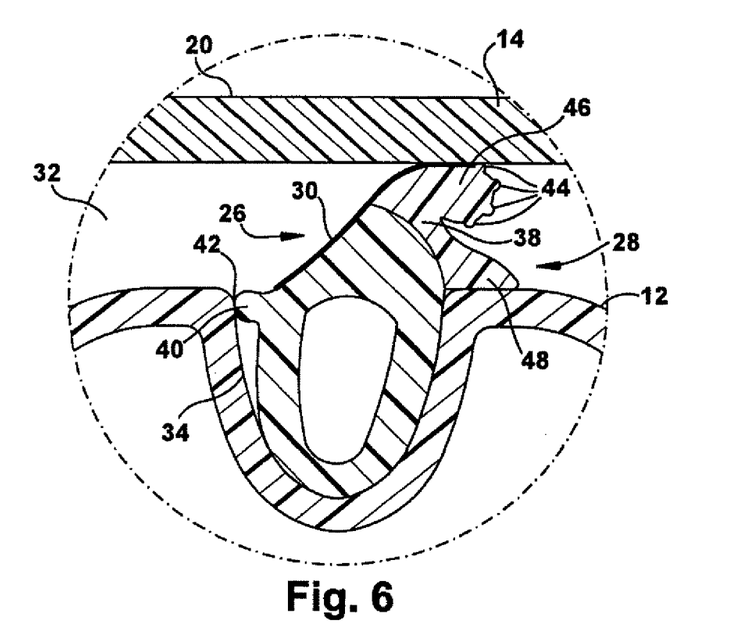
FIG. 6 is an enlarged fragmented view of FIG. 4 illustrating the gasket embodiment of FIG. 1 in a sealing position between two pipe sections.

Referring to FIGS. 4 and 6, the gasket 10 seals a gap 32 between the first tubular member 12 and the smooth annular section of the bell 20 when the first tubular member and smooth section of the second tubular member are in a relative surrounded and surrounding relationship. FIGS. 4 and 6 illustrate the contact between the lubricated material 30 and the second tubular member 14 during assembly.

In the illustrated embodiment of FIGS. 3-6, the first tubular member 12 is a corrugated pipe that includes a recess 34 in one of the ridges 18. It should be readily apparent that the inventive gasket 10 could be used on any type of pipe. For example, the gasket 10 could be used with PVC pipe, corrugated metal pipe, corrugated plastic pipe, fiberglass pipe, or cast iron pipe. Further it should be readily apparent that the outer pipe could include corrugations while the end of the inner pipe is smooth. For example, the gasket 10 could be used to form a PVC bell and spigot joint.

Referring again to FIG. 2, the lower portion 22 includes an anchor portion 36 shaped to fit within the recess 34 into a ridge 18 of the corrugated pipe and a flex piece 38 extends from the upper portion 24 eccentrically to one side of the anchor portion 36. In an alternative embodiment, (not illustrated) the anchor portion 36 is shaped to fit within a groove 16 in the corrugated pipe. A self-locating arm 40 extends from the lower portion 22 on the leading side 26 of the gasket 10. The self-locating arm 40 facilitates the positioning of the anchor portion 36 and the securing of the gasket 10 within the recess 34. In addition, the self-locating arm 40 compensates for a wide range of tolerances in the manufacturing of the tubular members, that is, compressing when the recess 34 is undersized and expanding when the recess tolerance is oversized. The self-locating arm 40 further assists in resisting stress imposed on the gasket 10 during assembly as best illustrated when comparing FIGS. 5 and 6. As the second tubular member 14 is advanced in a direction opposite the first tubular member 12 the gasket 10 is influenced in a direction away from the leading side 26 toward the trailing side 28. Accordingly, the self-locating arm 40 adjusts and expands to make-up the displacement forces resulting from the assembly of the two tubular members. This compression/expansion advancement of the self-locating arm 40 is not only appreciated during assembly, but is also experienced as a result of the stresses imposed during normal operation. The self-locating arm 40 further assists the gasket 10 in maintaining its orientation and position within the recess 34 when the two tubular members 12, 14 are pulled apart. The self-locating arm 40 also compensates for thermal changes, compressing and expanding opposite the changes to the recesses 34 in the tubular member 12, 14.

The self-locating arm 40 is sized such that contact maintained with a corresponding contact area 42 of the recess 34. Accordingly, debris and foreign materials are precluded from entering the recess 34, enhancing the fluid tight seal provided by the gasket 10. Further, the self-locating arm 40 acts to prevent the gasket 10 from rolling out of the recess 34.

A plurality of protrusions 44 project from a head member 46 of the upper portion 24 of the gasket 10. The protrusions 44 provide resistance in forming the seal illustrated in FIG. 6 as the gap 32 between the tubular members 12, 14 varies in size.

A shoulder 48 extends from the upper portion 24 along the top surface of an annular ridge 18. The shoulder 48 provides support to the flex portion 38 during the sealing engagement of the tubular members 12, 14 illustrated in FIG. 6. The gasket 10 further includes a cavity 50, body portion 52, and arcuate recess 54 that assist through their respective geometrical construction in controlling the amount of resistance created by the gasket between the two tubular members 12, 14. For example, the smaller the cavity 50 or the larger the radius of curvature in the arcuate recess 54 or the body portion 52 the greater the resistive force produced by the gasket 10 between tubular members 12, 14. Alterations as described above in the size of the cavity 50, body portion 52, or arcuate recess 54 are made to accommodate variations in the tolerances of the gap 32 to change the seal characteristics between the two tubular members 12, 14.

Figures 8A, 9:
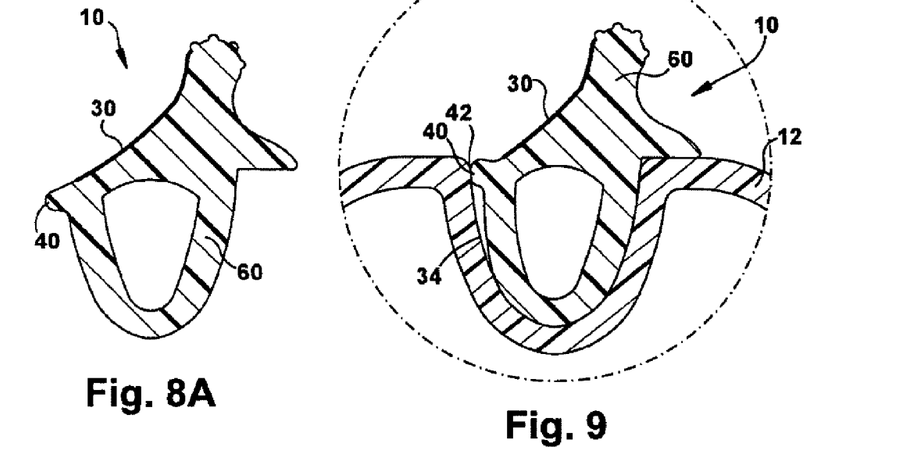
FIG. 8A is a sectional view of a gasket illustrating another exemplary embodiment constructed in accordance with the present invention.
FIG. 9 is a section view of the gasket embodiment illustrated in FIG. 8A seated in a channel of a corrugated pipe.
Figures 8B, 10:
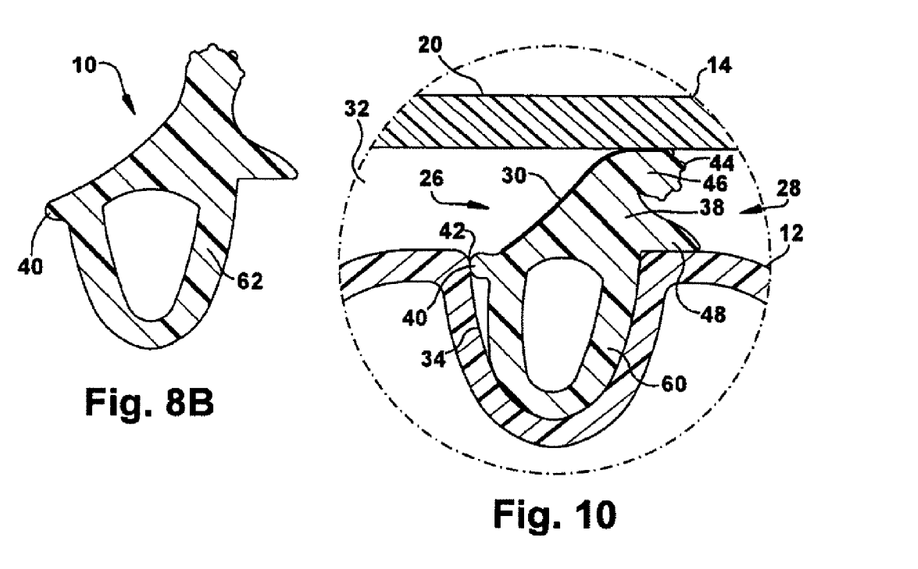
FIG. 8B is a sectional view of a gasket illustrating another exemplary embodiment constructed in accordance with the present invention.
FIG. 10 is a sectional fragmented view of the gasket embodiment illustrated in FIG. 8A in a sealing position between two pipe sections.

FIGS. 8-10 illustrate another exemplary embodiment of the gasket 10 constructed in accordance with the present invention. The gasket 10 in FIGS. 8A, 9, and 10 is comprised of two materials, the lubricated material 30 discussed with the exemplary embodiment of FIG. 2 and a uniform material 60 having a durometer range between 40 and 80 on a Shore A scale, including for example the first 25 or second 27 material used with the exemplary embodiment of FIG. 2.

FIG. 8B illustrates another exemplary embodiment of the gasket 10 constructed in accordance with the present invention. The gasket 10 in FIG. 8B is constructed of a single material 62 having a durometer range between 40 and 80 on a Shore A scale, lacking the lubricated material 30 of FIG. 8A. A suitable material for the single material 62 of the embodiment of FIG. 8B includes for example, the first 25 or second 27 material used with the exemplary embodiment of FIG. 2. A gasket 10 lacking the lubricated material 30 as illustrated in FIG. 8B and constructed from the single material 62 may be desired when the connection between the first tubular member 12 and second tubular member 14 is achieved mechanically.

The exemplary embodiments of FIGS. 8-10 illustrate the self-locating arm 40 and particularly illustrate a first locating and compressive state in FIG. 9 at a corresponding contact surface 42 found in the recess 34. As the first tubular member 12 and second tubular member 14 are assembled and achieve the sealing position of FIG. 10, stress is applied to the gasket 10 and the self-locating arm 40. FIG. 10 illustrates a second locating and compressive state of the self-locating arm 40. As demonstrated in FIG. 10, the self-locating arm remains in contact with the corresponding contact surface 42 of the recess 34. Accordingly, debris and foreign materials are precluded from entering the recess 34, enhancing the fluid tight seal provided by the gasket 10. Further, the self-locating arm 40 acts to prevent the gasket 10 from rolling out of the recess 34 should the two tubular members 12, 14 be pulled apart.

Figures 11, 12, 13, 14:
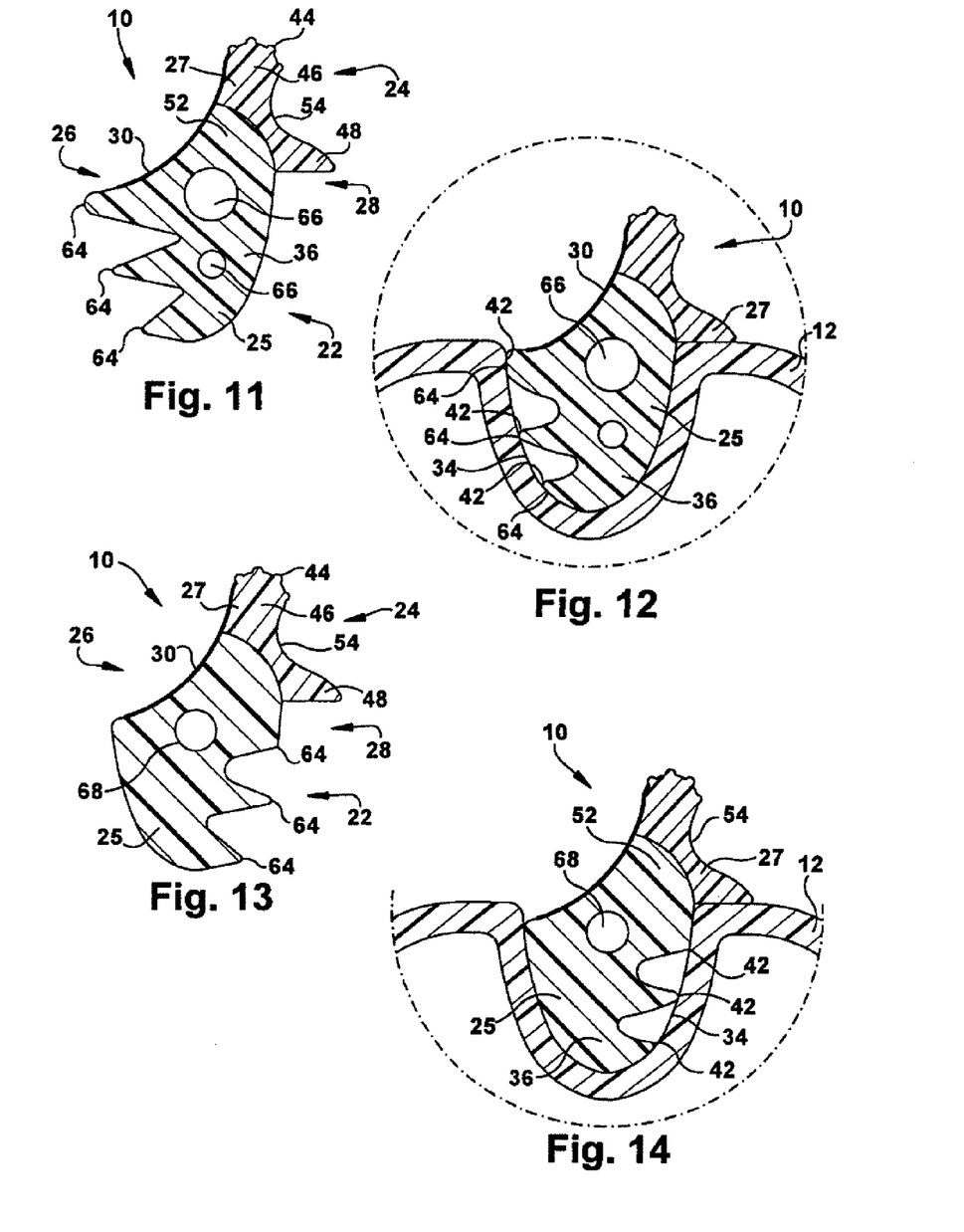
FIG. 11 is a sectional view of a gasket illustrating another exemplary embodiment constructed in accordance with the present invention.
FIG. 12 is a sectional view of the gasket embodiment illustrated in FIG. 11 seated in a channel of a corrugated pipe.
FIG. 13 is a sectional view of a gasket illustrating another exemplary embodiment constructed in accordance with the present invention.
FIG. 14 is a sectional view of the gasket embodiment illustrated in FIG. 13 seated in a channel of a corrugated pipe.

FIGS. 11 and 12 illustrate another exemplary embodiment having a plurality of variable size self-locating arms 64 located in the lower portion 22 of the leading side 26 of the gasket 10. Each self-locating arm 64 forms a corresponding contact surface 42 within the recess 34. Accordingly, debris and foreign materials are precluded from entering the recess 34, enhancing the fluid tight seal provided by the gasket 10. Lubricated material 30 extends along the leading side 26 from the lower portion 22 to the upper portion 24 of the gasket 10. For brevity, identical structures have been identified with the same reference numbers and share the same characteristics unless specifically stated. In addition, the gasket 10 of FIGS. 11 and 12 comprises three different materials 25, 27, and 30, but could be constructed from a single material 62 or a uniform material 60 without departing from the spirit and scope of the claimed invention.

The gasket 10 of FIGS. 11 and 12 further includes dual cavities 66, which change the compressive resistance when positioned between the tubular members 12, 14. For example, the larger the diametric opening of the cavities, the less resistance produced by the gasket 10 during the assembly of the tubular members 12 and 14.

The self-locating arms 64 facilitate the positioning of the anchor portion 36 and the securing of the gasket 10 within the recess 34. In addition, the self-locating arms 64 compensate for a wide range of tolerances in the manufacturing of the tubular members, that is, compressing when the recess 34 is undersized and expanding when the recess tolerance is oversized. The self-locating arms 64 adjust and expand to make-up the displacement forces resulting from the assembly of the two tubular members 12, 14. This compression/expansion advancement of the self-locating arms 64 is not only appreciated during assembly, but is also experienced as a result of the stresses imposed during normal operation. The self-locating arms 64 further assist the gasket 10 in maintaining its orientation and position within the recess 34 when the two tubular members 12, 14 are pulled apart. The self-locating arms 64 also compensate for thermal changes, compressing and expanding opposite the changes to the recesses 34 in the tubular member 12, 14.

In an alternative exemplary embodiment, the plurality of variable size self-locating arms 64 are located in the lower portion 22 of the trailing side 28 of the gasket 10 as illustrated in FIGS. 13 and 14. Each self-locating arm 64 forms a corresponding contact surface 42 within the recess 34. Accordingly, debris and foreign materials are precluded from entering the recess 34, enhancing the fluid tight seal provided by the gasket 10. Lubricated material 30 extends along the leading side 26 from the lower portion 22 to the upper portion 24 of the gasket 10. In addition, the gasket 10 of FIGS. 13 and 14 comprises three different materials 25, 27, and 30, but could be constructed from a single material 62 or a uniform material 60 without departing from the spirit and scope of the claimed invention.

The gasket 10 of FIGS. 13 and 14 further includes a single cavity 68 located between the body portion 52 and anchor portion 36, which changes the compressive resistance when positioned between the tubular members 12, 14. For example, the larger the diametric opening of the single cavity 68, the less resistance produced by the gasket 10 during the assembly of the tubular members 12 and 14.

The self-locating arms 64 facilitate the positioning of the anchor portion 36 and the securing of the gasket 10 within the recess 34. In addition, the self-locating arms 64 compensate for a wide range of tolerances in the manufacturing of the tubular members, that is, compressing when the recess 34 is undersized and expanding when the recess tolerance is oversized. The self-locating arms 64 adjust and expand to make-up the displacement forces resulting from the assembly of the two tubular members 12, 14. This compression/expansion advancement of the self-locating arms 64 is not only appreciated during assembly, but is also experienced as a result of the stresses imposed during normal operation. The self-locating arms 64 further assist the gasket 10 in maintaining its orientation and position within the recess 34 when the two tubular members 12, 14 are pulled apart. The self-locating arms 64 also compensate for thermal changes, compressing and expanding opposite the changes to the recesses 34 in the tubular member 12, 14.

Figure 15:
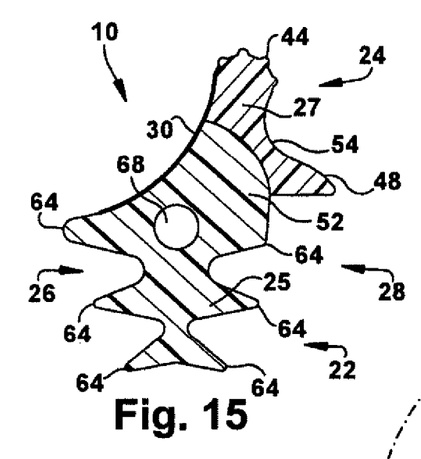
FIG. 15 is a sectional view of a gasket illustrating another exemplary embodiment constructed in accordance with the present invention.
Figure 16:
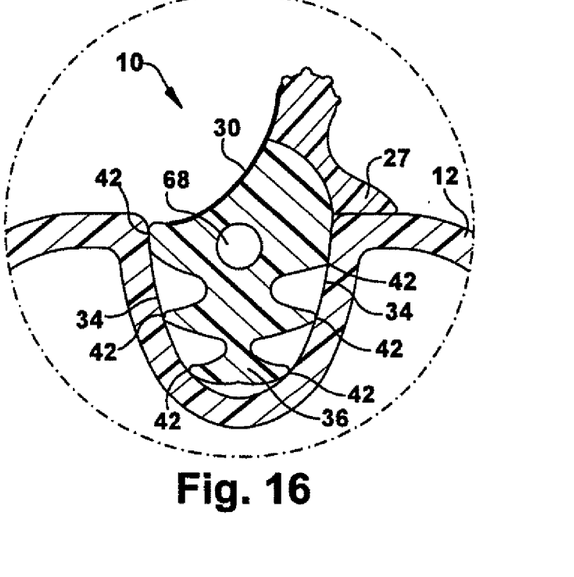
FIG. 16 is a sectional view of the gasket embodiment illustrated in FIG. 15 seated in a channel of a corrugated pipe.

FIGS. 15 and 16 illustrate another exemplary embodiment in which a plurality of variable size self-locating arms 64 are located in the lower portion 22 on both the leading 26 and trailing 28 sides of the gasket 10. Each self-locating arm 64 forms a corresponding contact surface 42 within the recess 34. Accordingly, debris and foreign materials are precluded from entering the recess 34, enhancing the fluid tight seal provided by the gasket 10. Lubricated material 30 extends along the leading side 26 from the lower portion 22 to the upper portion 24 of the gasket 10. In addition, the gasket 10 of FIGS. 15 and 16 comprises three different materials 25, 27, and 30, but could be constructed from a single material 62 or a uniform material 60 without departing from the spirit and scope of the claimed invention.

The gasket 10 of FIGS. 15 and 16 further includes a single cavity 68 located between the body portion 52 and anchor portion 36, which changes the compressive resistance when positioned between the tubular members 12, 14. For example, the larger the diametric opening of the single cavity 68, the less resistance produced by the gasket 10 during the assembly of the tubular members 12 and 14.

The self-locating arms 64 facilitate the positioning of the anchor portion 36 and the securing of the gasket 10 within the recess 34. In addition, the self-locating arms 64 compensate for a wide range of tolerances in the manufacturing of the tubular members, that is, compressing when the recess 34 is undersized and expanding when the recess tolerance is oversized. The self-locating arms 64 adjust and expand to make-up the displacement forces resulting from the assembly of the two tubular members 12, 14. This compression/expansion advancement of the self-locating arms 64 is not only appreciated during assembly, but is also experienced as a result of the stresses imposed during normal operation. The self-locating arms 64 further assist the gasket 10 in maintaining its orientation and position within the recess 34 when the two tubular members 12, 14 are pulled apart. The self-locating arms 64 also compensate for thermal changes, compressing and expanding opposite the changes to the recesses 34 in the tubular member 12, 14.

Figures 17, 18:
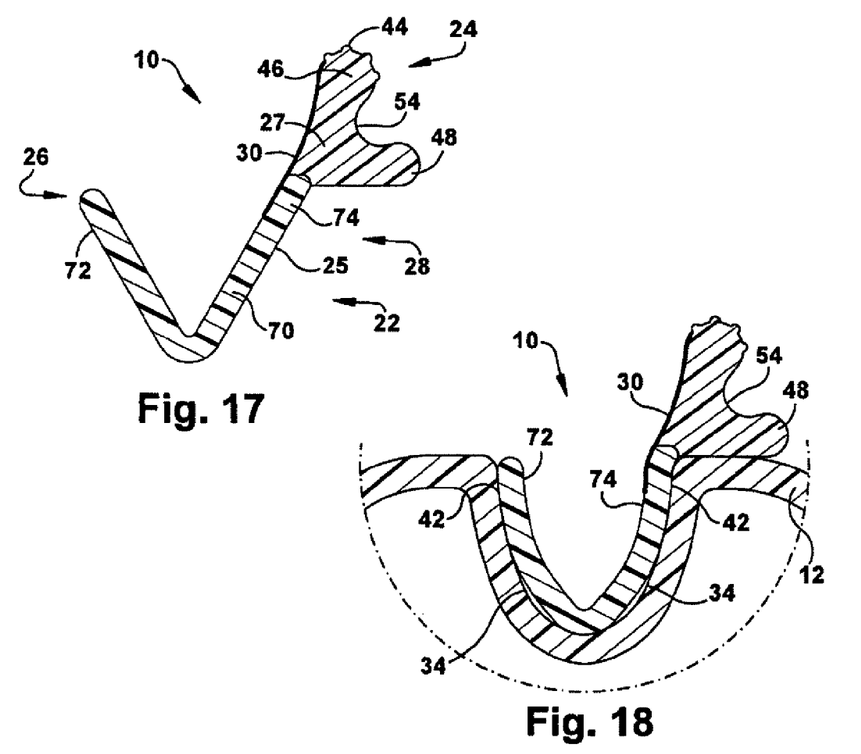
FIG. 17 is a sectional view of a gasket illustrating another exemplary embodiment constructed in accordance with the present invention.
FIG. 18 is a sectional view of the gasket embodiment illustrated in FIG. 17 seated in a channel of a corrugated pipe.

FIGS. 17 and 18 illustrate another exemplary embodiment in which a v-shaped anchor portion 70 forms a first and second variable size self-locating arms 72, 74, respectively in the lower portion 22 on both the leading 26 and trailing 28 sides of the gasket 10. The v-shaped anchor portion 70 can be pre-formed into the gasket 10 during the extruding or molding process by a v-shaped die. Alternatively, the v-shaped anchor portion 70 of the gasket 10 is extruded or molded in a linear-shaped die section such that the self-locating arms 72 and 74 are substantially coplaner prior to the insertion to the recess 34 and form the v-shaped anchor portion 70 upon being fit into the recess.

Figure 19:
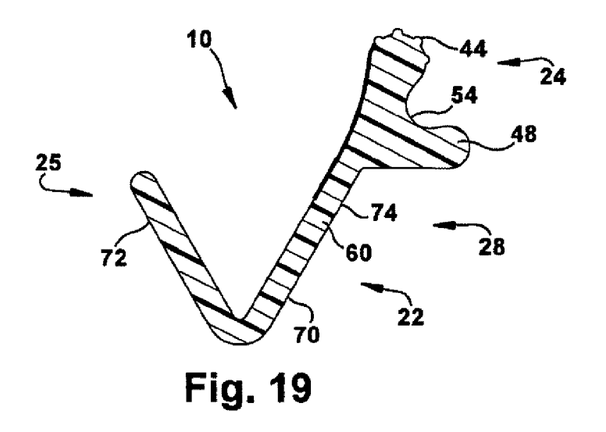
FIG. 19 is a sectional view of a gasket illustrating another exemplary embodiment constructed in accordance with the present invention.

Both self locating arms 72, 74 form a corresponding contact surface 42 within the recess 34. Accordingly, debris and foreign materials are precluded from entering the recess 34, enhancing the fluid tight seal provided by the gasket 10. Lubricated material 30 extends along the leading side 26 from the lower portion 22 to the upper portion 24 of the gasket 10. In addition, the gasket 10 of FIGS. 17 and 18 comprises three different materials 25, 27, and 30, but could be constructed from a single material 62 or a uniform material 60 (as illustrated in FIG. 19) without departing from the spirit and scope of the claimed invention. In an alternative embodiment, the self-locating arms 72, 74 could be formed from rigid material such as polyethylene or semi-rigid material having a durometer range between 80 and 90 on a Shore A scale.

The self-locating arms 72, 74 facilitate the positioning of the anchor portion 36 and the securing of the gasket 10 within the recess 34. In addition, the self-locating arms 72, 74 compensate for a wide range of tolerances in the manufacturing of the tubular members, that is, compressing when the recess 34 is undersized and expanding when the recess tolerance is oversized. The self-locating arms 72, 74 adjust and expand to make-up the displacement forces resulting from the assembly of the two tubular members 12, 14. This compression/expansion advancement of the self-locating arms 72, 74 is not only appreciated during assembly, but is also experienced as a result of the stresses imposed during normal operation. The self-locating arms 72, 74 further assist the gasket 10 in maintaining its orientation and position within the recess 34 when the two tubular members 12, 14 are pulled apart. The self-locating arms 72, 74 also compensate for thermal changes, compressing and expanding opposite the changes to the recesses 34 in the tubular member 12, 14.

While the present invention has been described with a degree of particularity, it is the intent that the invention includes all modifications and alterations from the disclosed design falling within the spirit or scope of the appended claims.

Having described the invention, the following is claimed:

1. A gasket for forming a sealing connection between a pair of adjoining tubular members comprising:
   a) a first section composed of a first material shaped to fit within a recess of one of a pair of adjoining tubular members, the first section having a letter "V" forming an outer anchor portion comprising first and second sides;
   b) a second section composed of a second material having a lower durometer than said first material and coupled with said first section and configured to make a sealing contact with the other of said pair of tubular members, the second section extending from one of said first or second sides of said first section and further comprises:
      i) a head member for engaging one of said pair of tubular members; and
      ii) a shoulder portion capable of being positioned outside of said recess in contact with the other of said pair of tubular members for providing support to the gasket;
   c) the anchor portion having at least two self-locating members capable of sealing contact within said recess and extending oppositely in an axial direction of the gasket forming the first and second sides of said anchor portion, the at least two self locating members biasing said first section when positioned into said recess to form a sealing connection; and
   d) the second section being positioned only on one of said two self locating members.

2. The gasket for forming a sealing connection of claim 1 wherein said second section further comprises a head member and shoulder portion eccentrically positioned about one of said first or second sides of said anchor portion of said first section.

3. The gasket for forming a sealing connection of claim 2 wherein said first section is made from a first material and said second section is made from a second material such that the first material has a higher durometer than said second material.

4. The gasket forming a sealing connection of claim 3 further comprising a lubricated material extending between said first and second sections.

5. A gasket for forming a sealing connection between a pair of adjoining tubular members comprising:
   a first section composed of a first material shaped to fit within a recess of one of a pair of adjoining tubular members, the first section having a letter "V" forming an outer anchor portion comprising first and second sides;
   a second section composed of a second material having a lower durometer than said first material and coupled with said first section and configured to make a sealing contact with the other of said pair of tubular members, the second section extending from one of said first or second sides of said first section and further comprises:
      a head member for engaging one of said pair of tubular members; and
      a shoulder portion capable of being positioned outside of said recess in contact with the other of said pair of tubular members for providing support to the gasket;
   the anchor portion having at least two self-locating members capable of sealing contact within said recess and extending oppositely in an axial direction of the gasket forming the first and second sides of said anchor portion, the at least two self locating members biasing said first section when positioned into said recess to form a sealing connection; and
   the second section being eccentrically positioned only on one of said two self locating members.

6. The gasket for forming a sealing connection of claim 5 wherein said first section is made from a first material and said second section is made from a second material such that the first material has a higher durometer than said second material.

7. The gasket for forming a sealing connection of claim 5 further comprising a lubricated material extending between said first and second sections.

8. A gasket for forming a sealing connection between a pair of adjoining tubular members comprising:
   a first section shaped to fit within a recess of one of a pair of adjoining tubular members, the first section having a letter "V" forming an outer anchor portion comprising first and second sides;
   a second section coupled with said first section and configured to make a sealing contact with the other of said pair of tubular members, the second section extending from one of said first or second sides of said first section and further comprises:
      i) a head member for engaging one of said pair of tubular members; and
      ii) a shoulder portion capable of being positioned outside of said recess in contact with the other of said pair of tubular members for providing support to the gasket;
   the anchor portion having at least two self-locating members capable of sealing contact within said recess and extending oppositely in an axial direction of the gasket forming the first and second sides of said anchor portion the at least two self locating members biasing said first section when positioned into said recess to form a sealing connection; and
   the second section being positioned only on one of said two self locating members.

9. The gasket for forming a sealing connection of claim 8 further comprising a lubricated material extending between said first and second sections.

10. The gasket for forming a sealing connection of claim 8 wherein said second section further comprises a head member and shoulder portion eccentrically positioned about one of said first or second sides of said anchor portion of said first section.

* * * * *